US012747134B2

(12) United States Patent
Miriyala et al.

(10) Patent No.: US 12,747,134 B2
(45) Date of Patent: Sep. 29, 2026

(54) ELEVATOR SYSTEM CONFIGURED TO PERFORM A SELF DIAGNOSIS AND METHOD OF OPERATING THE ELEVATOR SYSTEM

(71) Applicant: OTIS ELEVATOR COMPANY, Farmington, CT (US)

(72) Inventors: Pradeep Miriyala, Hyderabad (IN); Abhinav Dhar, Lucknow (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 968 days.

(21) Appl. No.: 18/074,717

(22) Filed: Dec. 5, 2022

(65) Prior Publication Data

US 2024/0182263 A1 Jun. 6, 2024

(51) Int. Cl.
*B66B 5/00* (2006.01)
*B66B 1/34* (2006.01)
*B66B 5/02* (2006.01)

(52) U.S. Cl.
CPC .......... *B66B 5/0018* (2013.01); *B66B 1/3453* (2013.01); *B66B 5/0037* (2013.01); *B66B 5/02* (2013.01)

(58) Field of Classification Search
CPC ......... B66B 1/24; B66B 1/28–30; B66B 1/32; B66B 1/34; B66B 1/3415; B66B 1/3423; B66B 1/3438; B66B 1/3446; B66B 1/3453; B66B 5/00; B66B 5/0006; B66B 5/0018–0037; B66B 5/02; B66B 5/04; B66B 5/06
See application file for complete search history.

(56) References Cited

U.S. PATENT DOCUMENTS

| | | | | |
|---|---|---|---|---|
| 7,392,883 B2 * | 7/2008 | Hikita | B66B 1/2466 187/383 |
| 9,708,155 B2 * | 7/2017 | Tokura | B66B 1/2433 |
| 2021/0094801 A1 * | 4/2021 | Evert | B66B 5/0025 |
| 2021/0371239 A1 * | 12/2021 | Witczak | B66B 5/0031 |
| 2022/0106162 A1 * | 4/2022 | Hahl | B66B 5/0087 |

* cited by examiner

*Primary Examiner* — Christopher Uhlir
(74) *Attorney, Agent, or Firm* — CANTOR COLBURN LLP

(57) ABSTRACT

An elevator system having elevator cars in a building, the system having: a first elevator car of the elevator cars configured to execute a self-diagnostic routine, wherein the first elevator car is configured to: instruct a subset of the elevator cars to enter an idle mode and analyze data shared by the first elevator car; process the operational data among the subset of the elevator cars; process the operational data among the subset of the elevator cars; collect operational data; share the operational data among the subset of the elevator cars; receive from the subset of the elevator cars an analysis of the operational data that is indicative of an operational state of the first elevator car; determine that a fault condition exists when the operational state is outside a threshold; and automatically execute a predetermined response upon when the first elevator car determines that the fault condition exists.

20 Claims, 6 Drawing Sheets

ELEVATOR SYSTEM CONFIGURED TO PERFORM A SELF DIAGNOSIS AND METHOD OF OPERATING THE ELEVATOR SYSTEM

BACKGROUND

The embodiments are directed to elevator systems and more specifically to an elevator system configured to perform a self-diagnosis and a method of operating the elevator system.

Mechanics may be required to tend to an elevator system for the purpose of performing elevator maintenance activities. This process may be time consuming and expensive. It is desirable to minimize the requirements for a mechanic to periodically perform maintenance checks on systems that are functioning properly and are otherwise not in need of service.

BRIEF SUMMARY

Disclosed is an elevator system including elevator cars in a building, the system including: a first elevator car of the elevator cars configured to execute a self-diagnostic routine, wherein the first elevator car is configured to: instruct a subset of the elevator cars to enter an idle mode and analyze data shared by the first elevator car; process the operational data among the subset of the elevator cars: collect operational data: share the operational data among the subset of the elevator cars: receive from the subset of the elevator cars an analysis of the operational data that is indicative of an operational state of the first elevator car: determine that a fault condition exists when the operational state is outside a threshold; and automatically execute a predetermined response upon when the first elevator car determines that the fault condition exists.

In addition to one or more of the above disclosed aspects of the system, or as an alternate, while the first elevator car executes the self-diagnostic routine, the first elevator car is configured to: move from floor to floor; collect noise and vibration data as the operational data while the first elevator car moves between the floors; and determine that the fault condition exists with the first elevator car from the analysis of the noise and vibrational data by the subset of the elevator cars.

In addition to one or more of the above disclosed aspects of the system, or as an alternate, while the first elevator car executes the self-diagnostic routine, the first elevator car is configured to: perform a door open-close operation of an elevator door of the first elevator car at each floor; collect, as the operational data, door operational data while performing the door open-close operation: and determine that the fault condition exists with the elevator door from the analysis of the door operational data by the subset of the elevator cars.

In addition to one or more of the above disclosed aspects of the system, or as an alternate, while the first elevator car executes the self-diagnostic routine, the first elevator car is configured to: collect air quality data, as the operational data, from an air quality sensor: and determine that the fault condition exists with an air filter from the analysis of the air quality data by the subset of the elevator cars.

In addition to one or more of the above disclosed aspects of the system, or as an alternate, the predetermined response includes an auto-clean operation to clean the air filter when the first elevator car determines that the fault condition exists with the air filter.

In addition to one or more of the above disclosed aspects of the system, or as an alternate, the predetermined response includes a service callback initiated by the first elevator car.

In addition to one or more of the above disclosed aspects of the system, or as an alternate, the first elevator car is configured to: generate a health status report from the analysis of the operational data by the subset of the elevator cars; and transmit the health status report to a predetermined recipient.

In addition to one or more of the above disclosed aspects of the system, or as an alternate, the first elevator car is configured to: compare elevator usage data for each of the elevator cars in the building against a usage threshold: and identify the subset of the elevator cars as ones of the elevator cars having elevator usage data that is indicative of usage below the usage threshold.

In addition to one or more of the above disclosed aspects of the system, or as an alternate, upon completion of the self-diagnostic routine, the first elevator car is configured to instruct each other elevator car in the subset of the elevator cars to perform the self-diagnostic routine.

In addition to one or more of the above disclosed aspects of the system, or as an alternate, the first elevator car is configured to: automatically execute the self-diagnostic routine daily, weekly or monthly.

Further disclosed is a method of operating elevator cars in a building, including: executing, by a first elevator car of the elevator cars, a self-diagnostic routine, including: instructing a subset of the elevator cars to enter an idle mode and analyze data shared by the first elevator car; processing the operational data among the subset of the elevator cars: collecting operational data: sharing the operational data among the subset of the elevator cars: receiving from the subset of the elevator cars an analysis of the operational data that is indicative of an operational state of the first elevator car: determining that a fault condition exists when the operational state is outside a threshold: and automatically executing a predetermined response upon determining that the fault condition exists.

In addition to one or more of the above disclosed aspects of the method, or as an alternate, executing the self-diagnostic routine includes the first elevator car: moving from floor to floor; collecting noise and vibration data as the operational data while the first elevator car moves between the floors; and determining that the fault condition exists with the first elevator car from the analysis of the noise and vibrational data by the subset of the elevator cars.

In addition to one or more of the above disclosed aspects of the method, or as an alternate, executing the self-diagnostic routine includes the first elevator car: performing a door open-close operation of an elevator door of the first elevator car at each floor: collecting, as the operational data, door operational data while performing the door open-close operation: and determining that the fault condition exists with the elevator door from the analysis of the door operational data by the subset of the elevator cars.

In addition to one or more of the above disclosed aspects of the method, or as an alternate, executing the self-diagnostic routine includes the first elevator car: collecting air quality data, as the operational data, from an air quality sensor; and determining that the fault condition exists with an air filter from the analysis of the air quality data by the subset of the elevator cars.

In addition to one or more of the above disclosed aspects of the method, or as an alternate, the predetermined response includes an auto-clean operation to clean the air filter upon determining that the fault condition exists with the air filter.

In addition to one or more of the above disclosed aspects of the method, or as an alternate, the predetermined response includes initiating a service callback.

The method of claim 11, wherein executing the self-diagnostic routine includes the first elevator car: generating a health status report from the analysis of the operational data by the subset of the elevator cars; and transmitting the health status report to a predetermined recipient.

In addition to one or more of the above disclosed aspects of the method, or as an alternate, the method includes the first elevator car: comparing elevator usage data for each of the elevator cars in the building against a usage threshold; and identifying the subset of the elevator cars as ones of the elevator cars having elevator usage data that is indicative of usage below the usage threshold.

In addition to one or more of the above disclosed aspects of the method, or as an alternate, upon completion of the self-diagnostic routine, the method includes the first elevator car instructing each other elevator car in the subset of the elevator cars to perform the self-diagnostic routine.

In addition to one or more of the above disclosed aspects of the method, or as an alternate, the method includes the first elevator car automatically executing the self-diagnostic routine daily, weekly or monthly.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
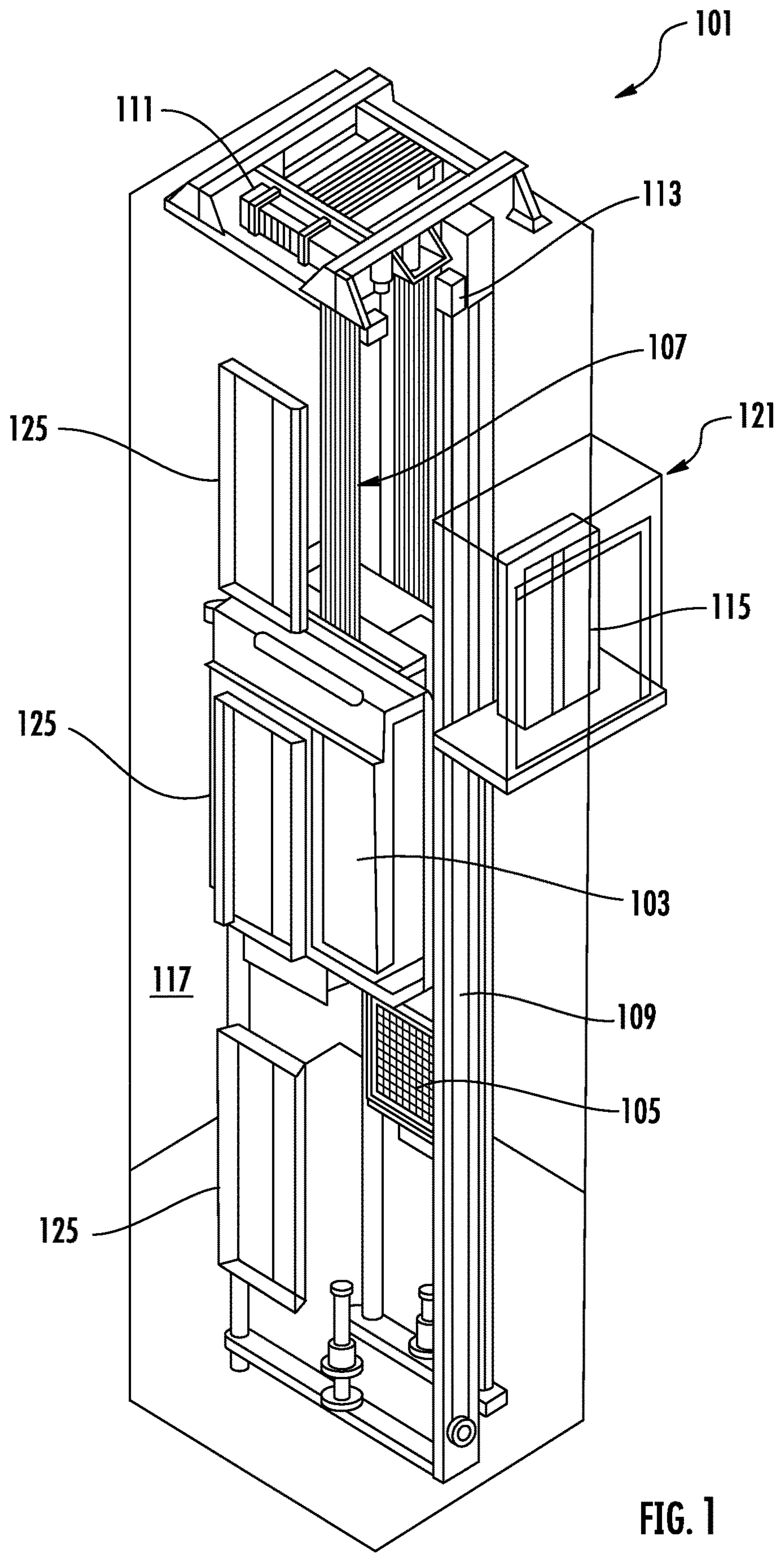
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail (or rail system) 109, a machine (or machine system) 111, a position reference system 113, and an electronic elevator controller (controller) 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft (or hoistway) 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self-propelled elevator cars (e.g., elevator cars equipped with friction wheels, pinch wheels or traction wheels). FIG. 1 is merely a non-limiting example presented for illustrative and explanatory purposes.

Figure 2:
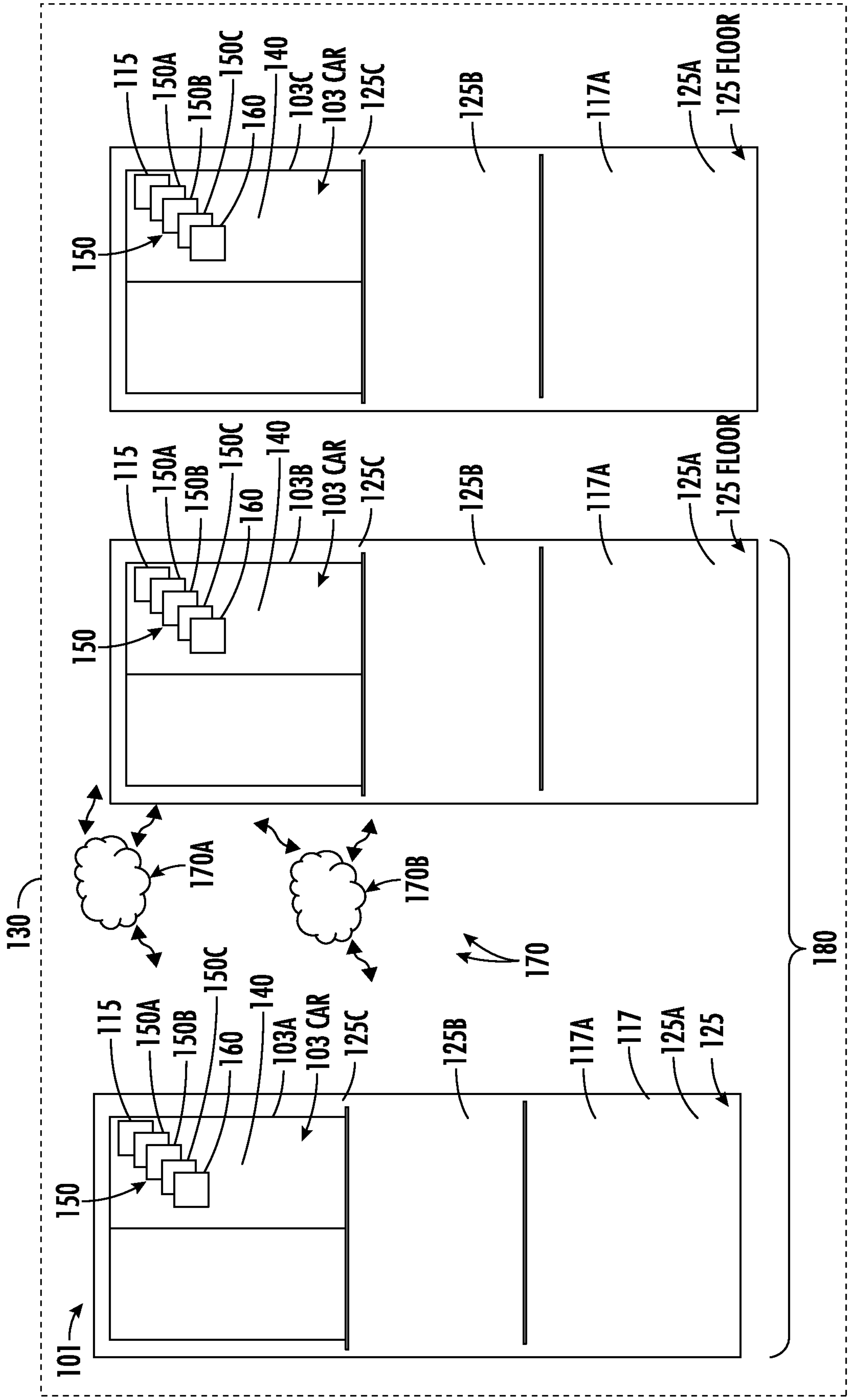
FIG. 2 is a further schematic illustration of an elevator system that may employ various embodiments of the present disclosure, where the elevator system includes a group of elevators.

Turning to FIG. 2, the elevator system 101 identified above, may be located in a building 130 having a plurality of levels 125, including first, second and third levels 125A-125C. The system 101 may include a plurality of elevator cars 103, including first, second and third elevator cars 103A-103C, distributed among a plurality of hoistways 117, including first, second and third hoistways 117A-117C. Each of the elevator cars 103 may include one of a controller 115, a door 140 and sensors 150, such as a noise and vibration sensor 150A, an air quality sensor 150B, and a door sensor 150C, which may be utilized to track operation and position of the door 140. The elevator cars 103 may also include an air filter 160. The elevator cars 103 may be configured to communicate with each other over a network, generally 170, that is a wired or wireless network as indicated below. The network 170 may include first and second networks 170A, 170B, the first network 170A being an Intranet for communications among elevator cars, peripheral computing devices equipped with elevators 103 and second network 170B being an Internet for communications of elevators with predetermined recipients. Cars 103 will share data on the mini-grid using the first network 170A while reports may be shared via the second network 170B. The first network 170A may have a higher throughput compared to the second network 170B.

The elevator cars 103 may be configured to execute a self-diagnostic routine or protocol. Under such a test, the elevator cars 103 (or a group of the elevator cars) may be able coordinate the computing power of a subset (or subgroup) 180 of the elevator cars 103 to operate as a mini-grid computer or computer cluster, e.g., during idle times. For example, in a building with a few elevator cars, the subset may be a couple of the elevator cars. In a building with many elevator cars distributed among different lobbies, a group of elevator cars may be assigned to a common lobby, and a subgroup of the group may be less than all of the elevator cars assigned to the common lobby.

To form the mini-grid, the peripheral computing devices on the elevator cars 103 which are idle would switch their operational mode to a diagnostics processing mode. The peripheral computing devices will broadcast their availability as being available for diagnostic processing. Polling of these broadcasts will lead to node (e.g., device, car, etc.) selection and creation of the mini-grid. In this mode, the computing power of peripheral devices will be used for mini-grid tasks such as signal processing, data analysis, diagnostics algorithms. For example, a display device on an idle car 103 will apply its computing power to the mini-grid rather than using the power for display purposes.

During diagnostic operation, if a high priority event, such as a fire, occurs, a current state of diagnostics may or may not be saved to allow the elevator 103 to be available for fire fighter operation, or any other emergency services, like health emergency, rescue etc. If the diagnostics state is saved, the elevator 103 can resume its diagnostics operation once a normal operational mode is restored.

Figure 3:
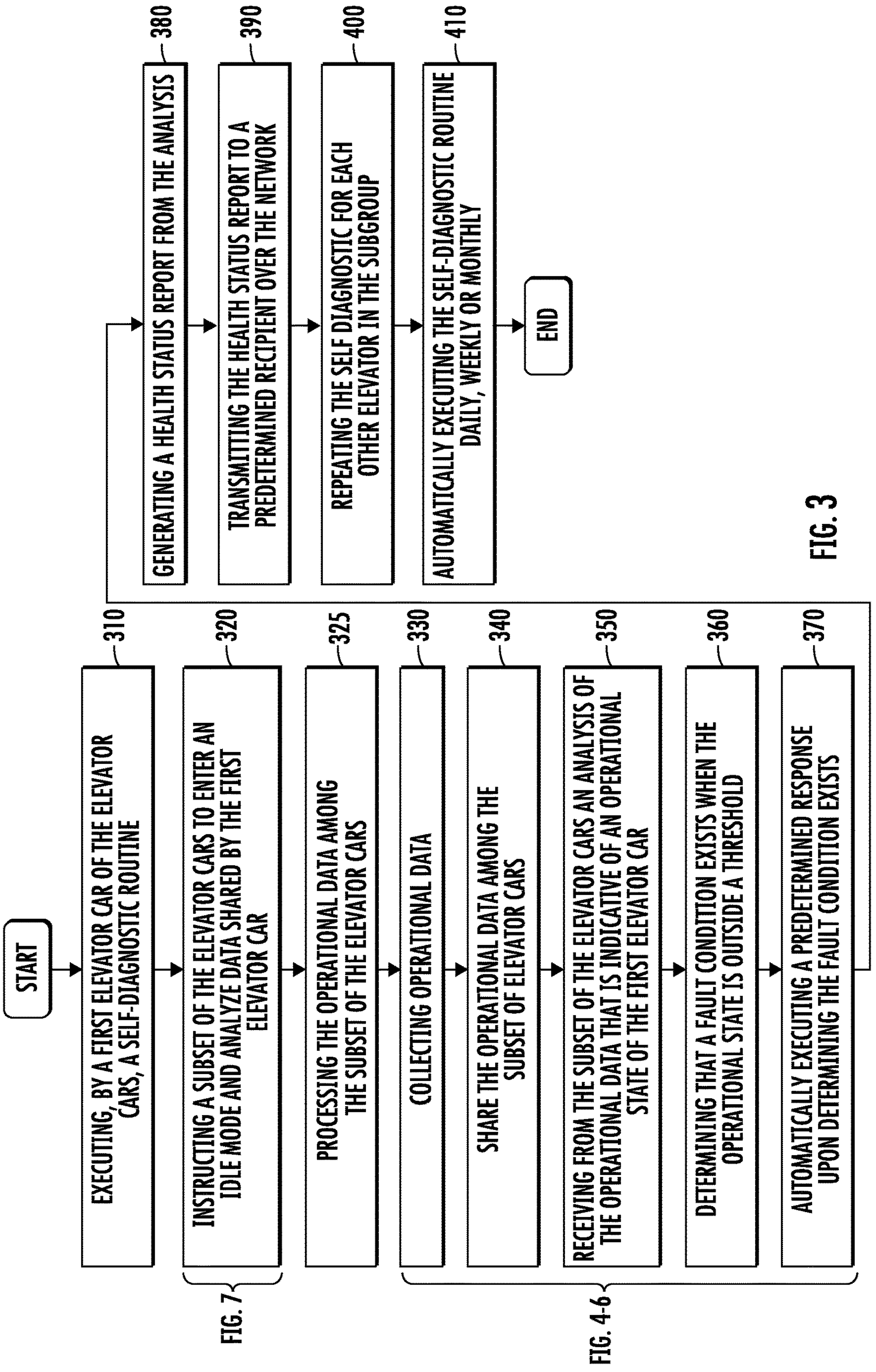
FIG. 3 is a flowchart showing a method of performing a diagnostic utilizing a subset of the elevators.

Turning to FIG. 3, a method of performing a self-diagnostic routine is shown. For example, as shown in block 310, the method includes executing, by the first elevator car 103A of the elevator cars 103, via communications among the controllers 115 over the network 170, the self-diagnostic routine. As shown in block 320, the method includes the first elevator car 103A instructing a subset 180 of the elevator cars 103 to enter an idle mode and collectively analyze data shared by the first elevator car 103A. As shown in block 325, the method includes processing the operational data among the subset 180 of the elevator cars 103. As shown in block 330, the method includes the first elevator car 103A collecting operational data, e.g., using sensors 150, while executing the self-diagnostic routine. As shown in block 340, the method includes the first elevator car 103A sharing the operational data among the subset 180 of the elevator cars 103. The frequency of collecting data by the first elevator car 103A may be increased during this process due to the enhanced ability to process data that is shared among the subset of elevator cars 103, thereby increasing the accuracy of the diagnostic results.

As shown in block 350, the method includes the first elevator car 103A receiving from the subset 180 of the elevator cars 103 an analysis of the operational data that is indicative of an operational state of the first elevator car 103A. As shown in block 360, the method includes the first elevator car 103A determining that a fault condition exists when the operational state is outside a threshold. For example, the operational state of the first elevator car 103A or implements therein may be outside of minimum and maximum acceptable design operational parameters, e.g., based on detected noise, vibrations, forces, velocity, acceleration, air quality, and other sensed parameters.

As shown in block 370, the method includes the first elevator car 103A automatically executing a predetermined response upon determining that the fault condition exists. As shown in block 380, the method may include the first elevator car 103A generating a health status report from the analysis of the operational data by the subset 180 of the elevator cars 103. As shown in block 390, the method may include the first elevator car 103A transmitting the health status report to a predetermined recipient over the network 170. As shown in block 400, the method may include repeating the self-diagnostic routine for each other elevator 103 in the subgroup. As shown in block 400, the method may include the first elevator car 103A automatically executing the self-diagnostic routine daily, weekly or monthly.

Figure 4:
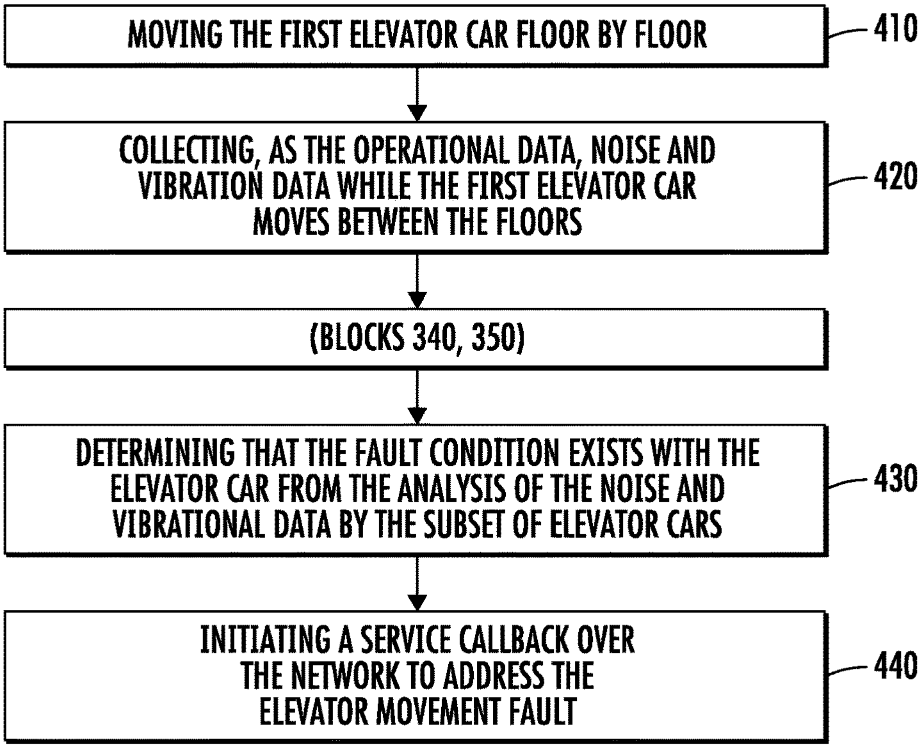
FIG. 4 is a flowchart showing additional features of the method shown in FIG. 3, directed to identifying a fault condition with movement of the elevator car between floors.

FIG. 4 shows additional or alternative aspects regarding blocks 330-370. As shown in block 410, the method may include the first elevator car 103A moving floor to floor. As shown in block 420, the method may include the first elevator car 103A collecting, as the operational data, noise and vibration data, via the noise and vibration sensor 150A, while the first elevator car 103A moves between the floors. Blocks 340 and 350, identifying a process of sharing the operational data among the subset of elevator cars 103 and receiving an analysis of the operational data from the subset of elevator cars 103, are the same as above. As shown in block 430, the method may include determining that the fault condition exists with the first elevator car 103A from the analysis of the noise and vibrational data by the subset 180 of elevator cars 103. As shown in block 440, the method may include the first elevator car 103A initiating a callback over the network 170 as the predetermined response to address a fault with the elevator movement.

Figure 5:
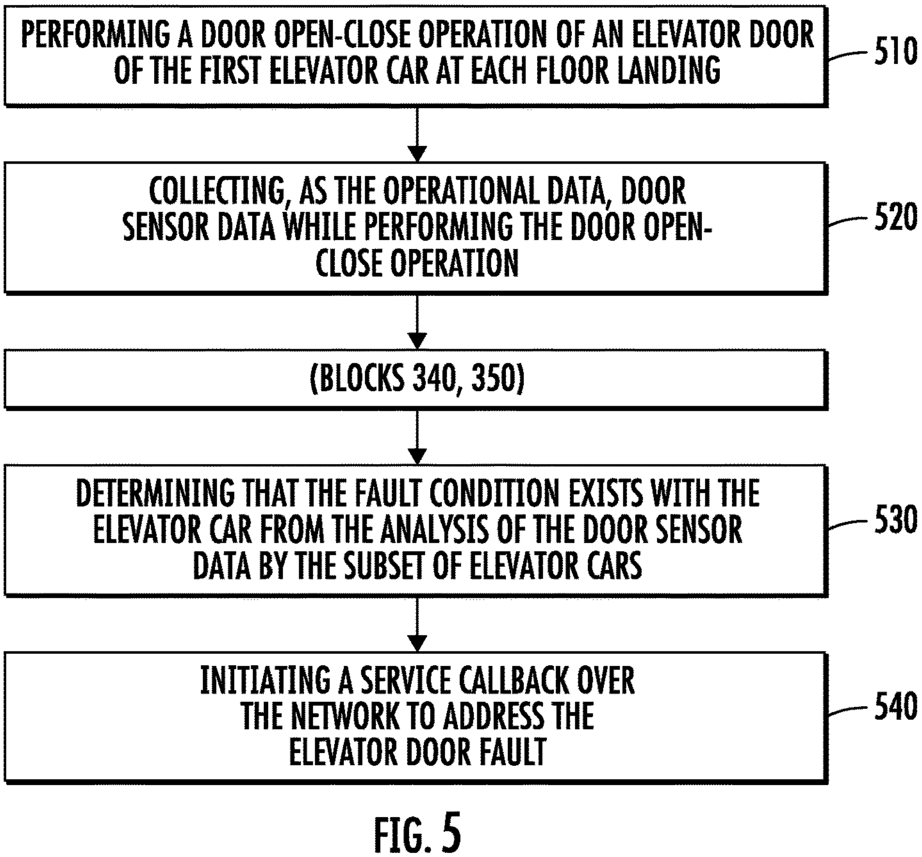
FIG. 5 is a flowchart showing additional features of the method shown in FIG. 3, directed to identifying a fault condition with operation of the elevator door.

FIG. 5 also shows additional or alternative aspects regarding blocks 330-370. As shown in block 510, the method may include the first elevator car 103A performing a door open-close operation of its elevator door 140 at each floor 125. As shown in block 520, the method may include the first elevator car 103A collecting, as the operational data, door sensor data from the door sensor 150C while performing the door open-close operation. Blocks 340 and 350, identifying a process of sharing the operational data among the subset of elevator cars 103 and receiving an analysis of the operational data from the subset of elevator cars 103, are the same as above. As shown in block 530, the method may include the first elevator car 103A determining that the fault condition exists with the elevator door 140 from the analysis of the door sensor data by the subset 180 of the elevator cars 103. As shown in block 540, the method may include the first elevator car 103A initiating a callback over the network 170 as the predetermined response to address a fault with the elevator door 140.

Figure 6:
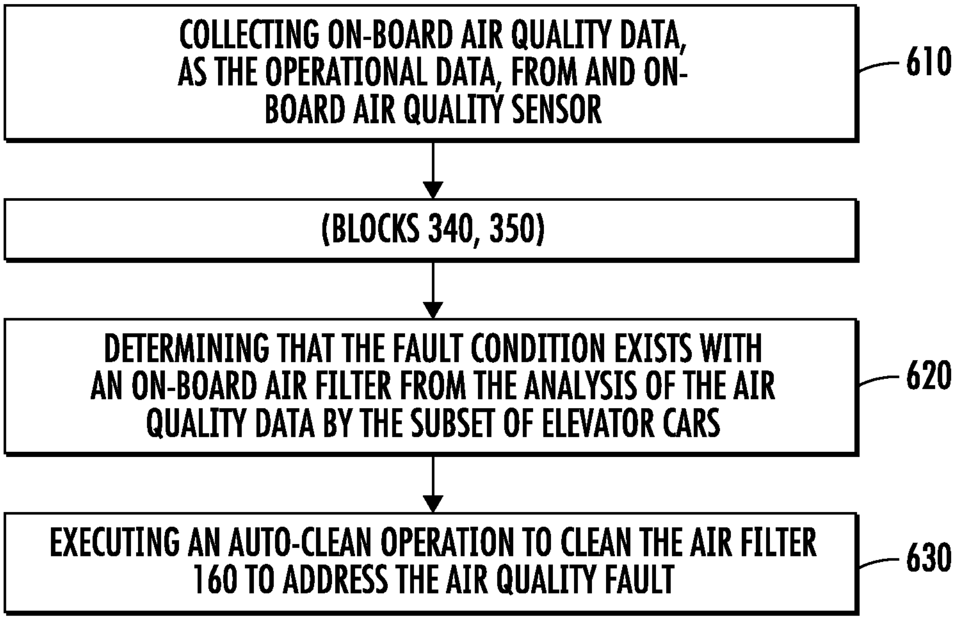
FIG. 6 is a flowchart showing additional features of the method shown in FIG. 3, directed to identifying a fault condition of an air filter.

FIG. 6 shows yet additional or alternative aspects regarding blocks 330-370. As shown in block 610, the method may includes the first elevator car 103A collecting on-board air quality data, as the operational data, from the air quality sensor 150B. Blocks 340 and 350, identifying a process of sharing the operational data among the subset of elevator cars 103 and receiving an analysis of the operational data from the subset of elevator cars 103, are the same as above. As shown in block 620, the method may include the first elevator car 103A determining that the fault condition exists with an on-board air filter 160 from the analysis of the operational data by the subset 180 of the elevator cars 103. As shown in block 630, the method may include the first elevator car 103A executing an auto-clean operation to clean the air filter 160 as the predetermined response upon determining that the fault condition exists with the air filter 160.

As can be appreciated, due to the enhanced ability for data processing among the elevator cars 103, some or all of the above data analyses may be performed simultaneously. Various faults may be efficiently identified and addressed during an diagnostic routine.

Figure 7:
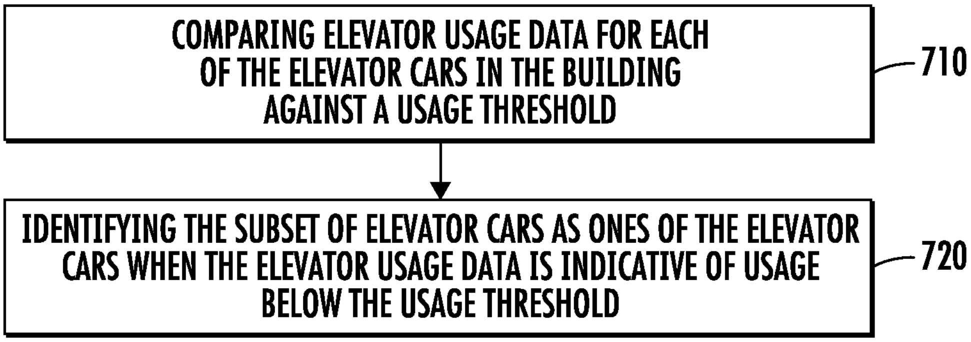
FIG. 7 is a flowchart showing additional features of the method shown in FIG. 3, directed to identifying which elevators of a group are in the subset.

Turning to FIG. 7, regarding identifying which of the elevator cars 103 may be utilized in the subset 180 (block 320), as shown in block 710, the method may include the first elevator car 103A comparing elevator usage data for each of the elevator cars 103 in the building 130 against a usage threshold. As shown in block 720, the method may include the first elevator car 103A identifying the subset 180 of the elevator cars 103 as ones of the elevator cars 103 with elevator usage data that is indicative of usage below the usage threshold. That is, elevator cars 103 that are unused in off-peak hours may be assigned to the subset 180 during execution of a diagnostic routine.

Figure 8:
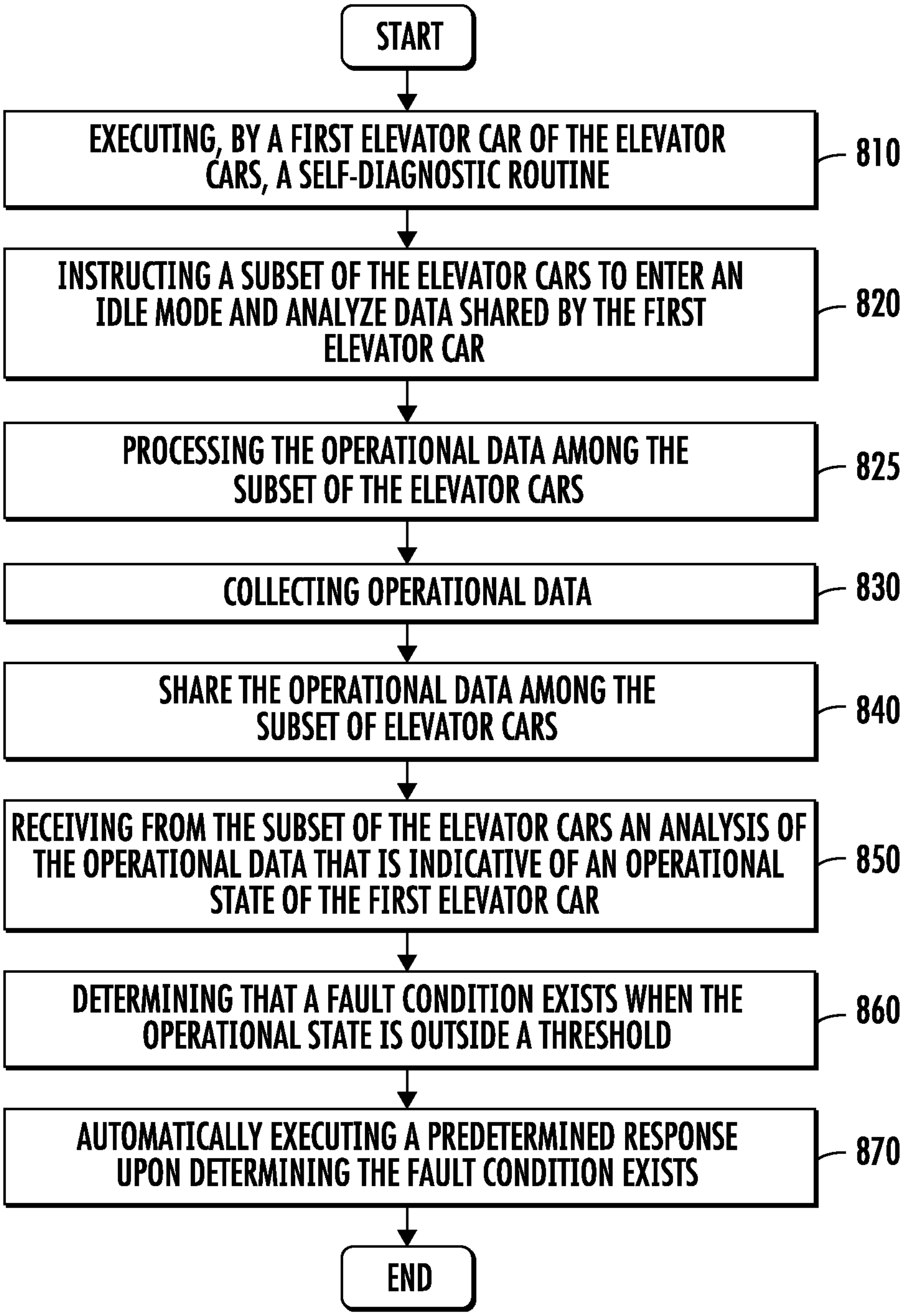
FIG. 8 is a flowchart generally showing the method that is shown in greater detail in FIG. 3.

Turning to FIG. 8, an overview of the disclosed method is shown. For example, as shown in block 810, the method includes executing, by the first elevator car 103A a self-diagnostic routine. As shown in block 820, the method includes the first elevator car 103A instructing a subset 180 of the elevator cars 103 to enter an idle mode and collectively analyze data shared by the first elevator car 103A. As shown in block 825, the method includes processing the operational data among the subset 180 of the elevator cars 103. As shown in block 830, the method includes the first elevator car 103A collecting operational data. As shown in block 840, the method includes the first elevator car 103A sharing the operational data among the subset 180 of the elevator cars 103. As shown in block 850, the method includes the first elevator car 103A receiving from the subset 180 of the elevator cars 103 an analysis of the operational data that is indicative of an operational state of the first elevator car 103A. As shown in block 860, the method includes the first elevator car 103A determining that a fault condition exists when the operational state is outside a threshold, such as identifying minimum and maximum acceptable design operational parameters. As shown in block 870, the method includes the first elevator car 103A automatically executing a predetermined response upon determining that the fault condition exists.

The above embodiments are configured to exploit idle time of elevators in a building to perform computationally intensive tasks. With the above embodiments, as the elevators in the building reach idle times, a subset of the elevators can be moved out of service and form a mini-grid computer for the group by utilizing an on-board peripheral computing devices that are installed on the elevators for various purposes like networking, display, cameras etc. An elevator on which self-diagnosis to be performed may change its IOT (internet-of-things) data collection frequency, e.g., by increasing its data collection frequency while running a self-diagnostic routine as the data processing computing load will be shared among the elevator peripheral computing devices. The elevator may collect drive quality and ride quality data related to noise and vibration using the sensors installed at drive and installed inside car during the run. The elevator may perform door open-close operations at every floor while recording landing door health data. Using an air quality sensor, a need for elevator cleaning, e.g., of an air quality filter, is detected and either auto cleaning is initiated or building management team is notified. The process may be repeated for each other elevator that is in the subset at the time a self-diagnostic routine is performed. Using collected data, the peripheral computing devices in the different elevators may calculate metrics and derive diagnostics and the elevator may share reports to the designated team, including mechanics, building administrators, and initiate a callback if a service need is detected. The self-diagnostic routine may run daily, weekly, monthly or on other frequencies basis on usage of the elevator cars. Benefits of the disclosed system include a reduction in periodic mechanic visits and a saving in time for diagnosing issues needing attention. The embodiments provide a solution that may be less costly than cloud dependent solutions, e.g., by reducing network throughput required for cloud based analytic decisions.

In the above embodiments, sensor data may be obtained and processed separately, or simultaneously and stitched together, or a combination thereof, and may be processed in a raw or complied form. The sensor data may be processed on the sensor (e.g. via edge computing), by controllers identified or implicated herein, on a cloud service, or by a combination of one or more of these computing systems. The senor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. The Internet of things (IoT) describes the network of physical objects—"things"—that are embedded with sensors, software, and other technologies for the purpose of connecting and exchanging data with other devices and systems over the Internet. Other LPWAN-IOT technologies include narrowband internet of things (NB-IOT) and Category MI internet of things (Cat MI-IOT). Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium.

The controller may further include, in addition to a processor and non-volatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection identified herein with other processors.

Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system including elevator cars in a building, the system comprising:

a first elevator car of the elevator cars configured to execute a self-diagnostic routine, wherein the first elevator car is configured to:
- instruct a subset of the elevator cars to enter an idle mode and analyze data shared by the first elevator car;
- collect operational data;
- share the operational data among the subset of the elevator cars;
- process the operational data among the subset of the elevator cars;
- receive from the subset of the elevator cars an analysis of the operational data that is indicative of an operational state of the first elevator car;
- determine that a fault condition exists in response to the operational state being outside a threshold; and
- automatically execute a predetermined response upon the first elevator car determining that the fault condition exists.

2. The system of claim 1, wherein while the first elevator car executes the self-diagnostic routine, the first elevator car is configured to:
- move from floor to floor;
- collect noise and vibration data as the operational data while the first elevator car moves between the floors; and
- determine that the fault condition exists with the first elevator car from the analysis of the noise and vibrational data by the subset of the elevator cars.

3. The system of claim 1, wherein while the first elevator car executes the self-diagnostic routine, the first elevator car is configured to:
- perform a door open-close operation of an elevator door of the first elevator car at each floor;
- collect, as the operational data, door operational data while performing the door open-close operation; and
- determine that the fault condition exists with the elevator door from the analysis of the door operational data by the subset of the elevator cars.

4. The system of claim 1, wherein while the first elevator car executes the self-diagnostic routine, the first elevator car is configured to:
- collect air quality data, as the operational data, from an air quality sensor; and
- determine that the fault condition exists with an air filter from the analysis of the air quality data by the subset of the elevator cars.

5. The system of claim 4, wherein:
- the predetermined response includes an auto-clean operation to clean the air filter when the first elevator car determines that the fault condition exists with the air filter.

6. The system of claim 1, wherein the predetermined response includes a service callback initiated by the first elevator car.

7. The system of claim 1, wherein the first elevator car is configured to:
- generate a health status report from the analysis of the operational data by the subset of the elevator cars; and
- transmit the health status report to a predetermined recipient.

8. The system of claim 1, wherein the first elevator car is configured to:
- compare elevator usage data for each of the elevator cars in the building against a usage threshold; and
- identify the subset of the elevator cars as ones of the elevator cars having elevator usage data that is indicative of usage below the usage threshold.

9. The system of claim 1, wherein:
- upon completion of the self-diagnostic routine, the first elevator car is configured to instruct each other elevator car in the subset of the elevator cars to perform the self-diagnostic routine.

10. The system of claim 1, wherein the first elevator car is configured to:
- automatically execute the self-diagnostic routine daily, weekly or monthly.

11. A method of operating elevator cars in a building, the method comprising:

executing, by a first elevator car of the elevator cars, a self-diagnostic routine, including:
- instructing a subset of the elevator cars to enter an idle mode and analyze data shared by the first elevator car;
- collecting operational data;
- sharing the operational data among the subset of the elevator cars;
- processing the operational data among the subset of the elevator cars;
- receiving from the subset of the elevator cars an analysis of the operational data that is indicative of an operational state of the first elevator car;
- determining that a fault condition exists in response to the operational state being outside a threshold; and
- automatically executing a predetermined response upon determining that the fault condition exists.

12. The method of claim 11, wherein executing the self-diagnostic routine includes the first elevator car:
- moving from floor to floor;
- collecting noise and vibration data as the operational data while the first elevator car moves between the floors; and
- determining that the fault condition exists with the first elevator car from the analysis of the noise and vibrational data by the subset of the elevator cars.

13. The method of claim 11, wherein executing the self-diagnostic routine includes the first elevator car:
- performing a door open-close operation of an elevator door of the first elevator car at each floor;
- collecting, as the operational data, door operational data while performing the door open-close operation; and determining that the fault condition exists with the elevator door from the analysis of the door operational data by the subset of the elevator cars.

14. The method of claim 11, wherein executing the self-diagnostic routine includes the first elevator car:

collecting air quality data, as the operational data, from an air quality sensor; and determining that the fault condition exists with an air filter from the analysis of the air quality data by the subset of the elevator cars.

15. The method of claim 14, wherein:

the predetermined response includes an auto-clean operation to clean the air filter upon determining that the fault condition exists with the air filter.

16. The method of claim 11, wherein the predetermined response includes initiating a service callback.

17. The method of claim 11, wherein executing the self-diagnostic routine includes the first elevator car:

generating a health status report from the analysis of the operational data by the subset of the elevator cars; and transmitting the health status report to a predetermined recipient.

18. The method of claim 11, including the first elevator car:

comparing elevator usage data for each of the elevator cars in the building against a usage threshold; and identifying the subset of the elevator cars as ones of the elevator cars having elevator usage data that is indicative of usage below the usage threshold.

19. The method of claim 11, wherein:

upon completion of the self-diagnostic routine, the method includes the first elevator car instructing each other elevator car in the subset of the elevator cars to perform the self-diagnostic routine.

20. The method of claim 11, including:

the first elevator car automatically executing the self-diagnostic routine daily, weekly or monthly.

* * * * *